Oct. 25, 1960 G. E. KOSLOW 2,958,015

ELECTRONIC AMPLIFIERS

Filed July 9, 1954

INVENTOR.
GEORGE E. KOSLOW
BY
J. B. Felshin
ATTORNEY.

United States Patent Office 2,958,015
Patented Oct. 25, 1960

2,958,015

ELECTRONIC AMPLIFIERS

George E. Koslow, 19 Murray St., New York 7, N.Y.

Filed July 9, 1954, Ser. No. 442,288
10 Claims. (Cl. 317—130)

This invention relates to electronic amplifiers and is directed particularly to amplifiers for use with phototube input circuits and input circuits having similar electrical characteristics.

One object of the invention is to provide an improved amplifier for phototubes and the like signal source elements having a current characteristic substantially independent of voltage for at least part of their operating rance.

Another object of the invention is to provide an amplifier of the character described having a cathode follower load circuit yet providing amplification.

Another object of this invention is to provide a vacuum tube amplifier of the above nature which combines the advantages of conventional plate load amplifier circuits with those of cathode follower circuits.

Another object of this invention is to provide an electronic phototube amplifier not requiring a separate voltage supply source for the phototube.

Another object of this invention is to provide an amplifier of the character described that can be energized either with D.C. or A.C. plate voltage, that is comprised of few and simple parts, that is easy to maintain, and that is foolproof and reliable in operation.

These and other objects will be apparent from the following description taken together with the accompanying drawings, Fig. 1 is an electrical schematic diagram of a phototube amplifier embodying the invention and designed to operate from a D.C. source of plate voltage;

In brief, the circuit comprising the invention is one in which the amplifier load is in series with the cathode, and wherein the signal source load resistor is connected to or near cathode potential, the signal source having a current characteristic substantially independent of its excitation voltage.

Figures 1, 2:
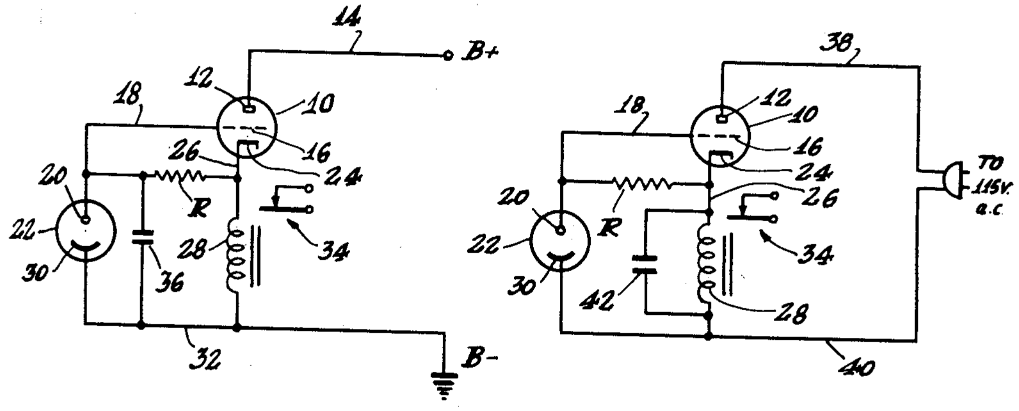
Fig. 2 is a schematic diagram of an amplifier similar to that shown in Fig. 1 but designed to operate directly from ordinary A.C. house current.

Referring now to the drawings, Fig. 1 illustrates the improved amplifier circuit comprising the invention adapted for operation from a D.C. source of plate supply. The circuit comprises a triode vacuum tube amplifier 10 having a plate element 12 connected through a wire 14 directly to B+ plate supply, a grid element 16 connected through a wire 18 to the anode 20 of a phototube 22, and an indirectly heated cathode element 24 connected through a wire 26 to one terminal of a relay coil 28. A phototube load resistor R is connected between wires 18 and 26. The cathode 30 of the phototube 22 is connected in common with the remaining terminal of the relay coil 28 to ground and the negative terminal of the source of plate voltage supply, designated B—, through a conductor 32.

The relay coil 28 has associated with it a normally closed movable contact switch, indicated generally by the numeral 34, adapted to be open circuited when said relay coil is energized.

The operation of the circuit shown in Fig. 1 is as follows: When the light impinges upon the phototube 22, a heavy current will be caused to flow through the load resistor R, resulting in an increased voltage drop thereacross. Since the resistor R is also connected between the grid 16 and the cathode 24 of triode 10, the grid potential is made more negative with respect to the cathode as a result of the increased current flowing through the load resistor R. As a result, plate current through the triode 10, normally biased for sufficient conduction to actuate the relay contacts 34, is reduced to the point where the relay deactuates to close the relay contacts 34 and thereby close any desired circuit (not illustrated) for example to operate electrical devices such as counters, alarms, to stop and start motors, etc.

It will be noted that actuation of the circuit by light striking the phototube results not only in a decrease in voltage across the relay coil 28 (to deenergize it) but results in a decrease in anode voltage supplied the phototube 22 fed from the voltage drop across the coil. However, where proper choice (within a wide latitude) is made of component values, the voltage across the phototube load resistor R will not change much as a result, over the effective (operate and release) range of relay voltage, because the conduction of a phototube characteristically is nearly constant over a wide voltage range. Appreciable negative feedback and resultant loss of gain is therefore minimized.

A relay operating at a high level of current, particularly at break, is preferably used in order to provide more voltage for the phototube and thereby obtain greater sensitivity.

A capacitor 36 shunted across the phototube 22 as further illustrated in Fig. 1 will allow the device to respond quickly to strong light, and slowly to a decrease in light, thereby adapting it for use as a jam-up alarm.

Fig. 2, an embodiment of the invention for A.C. operation differs from the device in Fig. 1 in that it is energized through supply leads 38 and 40 from an ordinary 115 v. A.C. service line. Due to the half-wave rectifying action of the triode 10, and consequent pulsing D.C. current through the relay coil 28, a condenser 42 is preferably connected in parallel with the relay coil to prevent chatter. Operation of the circuit otherwise is the same as that of the D.C. circuit described above in connection with Fig. 1.

Figures 3, 4:
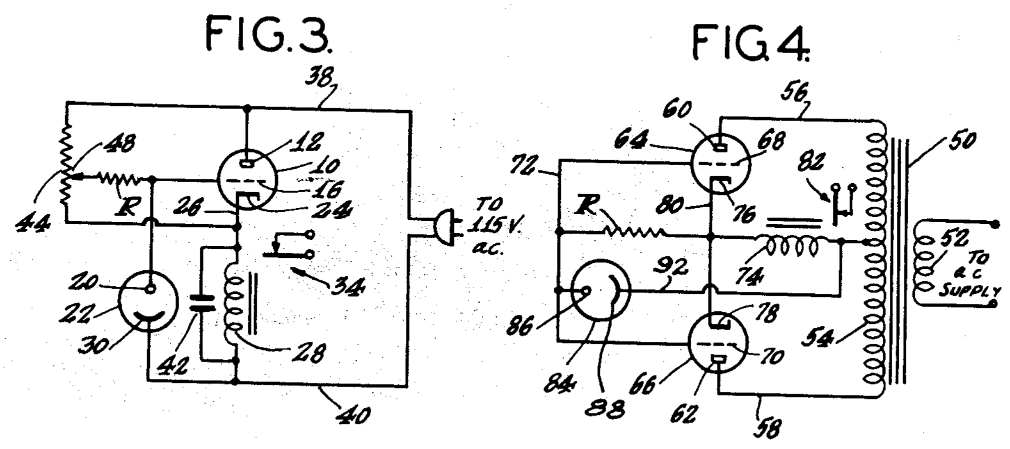
Fig. 3 is a modified form of the circuit shown in Fig. 2 providing adjustment of the phototube to different light conditions.
Fig. 4 is another modification illustrating how the principle of the invention can be applied to push-pull circuit operation.

In the modification illustrated in Fig. 3 means for adjusting the sensitivity of the device is illustrated, comprising a potentiometer 44 connected across the plate 12 and the cathode 24 of the triode 10. The phototube load resistor R, instead of being connected directly to the cathode 20 of the triode 10, is connected to the movable contact 48 of the potentiometer 44, whereby the positive grid bias of the triode 10 can be increased as the movable contact is moved to the upper or plate voltage position. A variable decrease in sensitivity therefore results, depending upon the setting of the potentiometer contact 48.

Fig. 4 illustrates the circuit comprising the invention applied to push pull operation. A transformer 50 has a primary winding 52 energized, for example, by a 115 volt A.C. service line, and a center-tapped secondary winding 54 the outer terminals of which are connected through wires 56 and 58 to the plates 60 of a pair of triodes 64, 66, respectively. The control grids 68, 70 of the triodes 64, 66 are interconnected by a wire 72 and phototube load resistor R and a relay coil 74 is connected in series between the wire 72 and the center tap of the secondary winding 54. The cathodes 76 and 78 of the respective triodes 64, 66 are interconnected by a wire 80 and connected in common with the common interconnection between the phototube load resister R and the relay coil 74. The relay coil 74 is provided with a normally closed switch 82 adapted to be opened when the relay is energized. A phototube 84 has its anode 86 connected to the common wire 72 interconnecting the grids 68, 70 and its cathode 88 connected through a wire 92 to the center tap of the secondary winding 54.

The operation of the push-pull circuit illustrated in Fig. 4 is similar to that described in connection with the A.C. circuit shown in Fig. 2, the only difference being that each half-wave of the A.C. supply voltage is utilized, succeeding half waves flowing alternately through the triodes 64, 66, whereby full wave operation is achieved. Because such full wave or "push-pull" operation results in a smoother energization current through the relay coil 74 a shunt condenser similar to the one indicated by the numeral 42 in Fig. 1 may not be required.

Figures 5, 6:
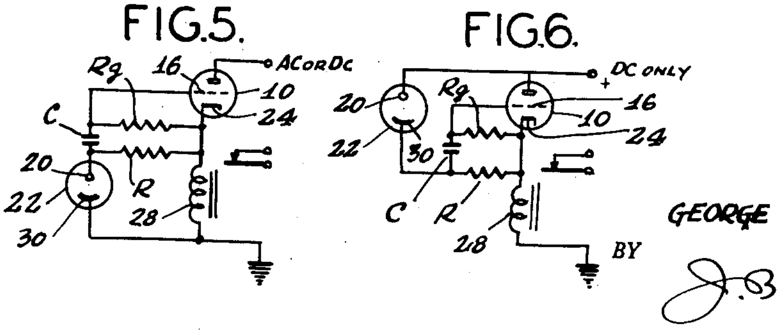
Fig. 5 is another modification illustrating how the principle of the invention can be applied in a capacitively coupled signal input circuit.
Fig. 6 is still another modification of the invention applied to a capacitively coupled circuit.

As illustrated in Figs. 5 and 6 the invention can also be applied to capacity coupled input circuits. In Fig. 5, the grid 16 of tube 10 is connected through an ordinary grid bias resistor R*g* to the cathode 24. The anode 20 of the phototube 22 is connected through a condenser C to the grid 16. The grid 16 is thus not directly connected to the signal source load resistor R, but is connected through the condenser C, so that it will respond to a pulse of or to a change in light level rather than to the absolute value of light. Operation is otherwise the same as described above in connection with the D.-C. coupled circuits.

In Fig. 6, a modification of Fig. 5, the phototube 22 has its anode 20 connected with the high potential terminal of the source and its cathode 30 connected to the load resistor R. It will be apparent that in this modification the phototube signal operates the grid in the opposite direction from that of the other illustrated circuits by utilizing the difference between the load and applied voltage as the signal source excitation voltage.

In order that the present invention may readily be constructed and successfully utilized as herein described, certain values of circuit elements are suggested below. These values, which apply especially to the circuit arrangement illustrated in Fig. 1 are given solely by way of example and are not to be construed as a limitation of this invention of which various modifications and adaptations will be apparent to those skilled in the art.

| | | |
|---|---|---|
| Triode **10** | | Type 6C4 |
| Phototube **22** | | Type 922 |
| Resistor R | megohms | 20 |
| Relay coil **28** | ohms | 10,000 |
| Condenser **36** | mfd | .05 |
| Plate supply voltage B+ | volts | 115 |

Having thus described my invention in some detail what I claim as new and desire to protect by Letters Patent of the United States, is:

1. In an electronic amplifier, the combination comprising a potential controlled tube having a plate, a control grid and a cathode, a source of plate voltage supply having a pair of output terminals, a circuit connecting one terminal of said source with said plate, a load device connected in series with said cathode and connected with the other terminal of said source, a source of signal current operating under conditions that provides a substantially constant current output characteristic for wide variations in excitation voltage, circuit means including a load resistor for energizing said signal current source from the voltage drop across said load device, and a conductor connecting said resistor in series with said grid and said cathode, for increasing the negative bias of said grid with respect to said cathode upon increase in load current through said resistor, values for said components for providing substantially the same amplification as in a conventional plate load amplifier.

2. In an electronic amplifier, the combination comprising a potential controlled tube having a plate, a control grid and a cathode, a source of plate voltage supply having a pair of output terminals, a circuit connecting one terminal of said source with said plate, a load device connected in series with said cathode and connected with the other terminal of said source, a suitable phototube, circuit means including a load resistor for energizing said phototube operating under conditions of radiation, energizing voltage, and load value providing substantially constant current characteristics for useful variations in energizing voltage from the entire voltage drop across said load device, and a second circuit means connecting said resistor in series with said grid and said cathode, for increasing the negative bias of said grid with respect to said cathode upon increase in load current through said resistor.

3. In an electronic amplifier, the combination comprising a potential controlled tube having a plate, a control grid and a cathode, a source of plate voltage supply having a pair of voltage supply terminals, a circuit connecting one terminal of said source with said plate, a load device connected in series with said cathode and connected with the other terminal of said source, a phototube operating in its range of constant current and output, circuit means including a load resistor, and a phototube load circuit for energizing said phototube from the voltage drop across said load device, a condenser shunted across said phototube, and a second circuit means connecting said resistor in series with said grid and said cathode for increasing the negative bias of said grid with respect to said cathode upon increase in load current through said resistor.

4. The invention as defined in claim 3 wherein said load device is a current operated relay having a large make and break current.

5. The invention as defined in claim 2 wherein said plate voltage source is alternating current, wherein said load device comprises a circuit-switching relay, and including a condenser shunted across said relay.

6. In an electronic amplifier, the combination comprising a potential controlled tube having a plate, a control grid and a cathode, a source of plate voltage supply having a pair of voltage supply terminals, a circuit connecting one terminal of said source with said plate, a load device connected in series with said cathode and connected with the other terminal of said source, a source of signal current having a substantially constant current output characteristic for wide variations in excitation voltage, circuit means including a load resistor for energizing said signal current source from the voltage drop across said load device, and a second circuit means connecting said resistor between said grid and said cathode, for increasing the negative bias of said grid with respect to said cathode upon increase in load current through said resistor, and means included in said second circuit means to vary the sensitivity thereof.

7. In a push pull amplifier circuit the combination of a pair of potential controlled tubes each having a plate, a control grid and a cathode, a load device connected in the cathode circuit of said tubes, a source of voltage supply for said pair of tubes, means to connect said source of voltage supply to the plates of said tubes, means to connect said source of voltage supply to said load device, a source of signal current having a substantially constant current output characteristic for wide variations in excitation voltage, circuit means including a series load resistor for energizing said signal current source from the voltage drop across said load device, said resistor being connected between the grids and cathodes of said tubes for alternately increasing the negative bias of said grids with respect to their respective cathodes upon increase in load current through said resistor.

8. In an electronic amplifier, the combination comprising a potential controlled tube having a plate, a control grid and a cathode, a source of plate supply having a pair of voltage supply terminals, a circuit connecting one terminal of said source with said plate, a load device connected in series with said cathode and connected with the other terminal of said source, a source of signal current having a substantially constant current output for wide variations of excitation voltage, circuit means for energizing said signal current source and dependent upon the voltage drop across said load device, a load resistor in said circuit means, and a second circuit means capacitatively interconnecting said grid with said load resistor for varying the bias of said grid with respect to said cathode upon change in load current through said resistor.

9. In an electronic amplifier, the combination comprising a potential controlled tube having a plate, a control grid and a cathode, a source of plate supply having a pair of voltage supply terminals, a circuit connecting one terminal of said source with said plate, a load device connected in series with said cathode and connected with the other terminal of said source, a source of signal current having a substantially constant current output for wide variations of excitation voltage, circuit means including a load resistor for energizing said signal current source and dependent upon the voltage drop across said load device, and a second circuit means interconnecting said grid with said load resistor for varying the bias of said grid with respect to said cathode upon change in load current through said resistor.

10. In an amplifier circuit, the combination comprising an amplifying means, a source of voltage, a circuit connecting said source with the input of said amplifying means, a load device connected to the output of said amplifying means, means to connect said source of voltage to said load device, a source of signal current having a substantially constant current output for wide variation of excitation voltage, circuit means for energizing said signal current source from the voltage drop across said load device, a load resistor in said circuit means, and a second circuit means connecting the input of said amplifying means with said load resistor for energizing the input of said amplifying means.

References Cited in the file of this patent

UNITED STATES PATENTS

| | | |
|---|---|---|
| 2,232,373 | Dorst | Feb. 18, 1941 |
| 2,309,329 | Powers | Jan. 26, 1943 |
| 2,413,076 | Schick | Dec. 24, 1946 |
| 2,522,348 | Dahline | Sept. 12, 1950 |
| 2,572,509 | Novick | Oct. 23, 1951 |
| 2,573,627 | Vanderkip | Oct. 30, 1951 |
| 2,634,412 | Meagher | Apr. 7, 1953 |
| 2,640,875 | Deveaux | June 2, 1953 |